United States Patent [19]

Van Simaeys et al.

[11] Patent Number: 4,688,211
[45] Date of Patent: Aug. 18, 1987

[54] TELECOMMUNICATION SWITCHING SYSTEM

[75] Inventors: Francoise C. G. Van Simaeys, Brussels; Pierre-Paul Guebels, Edegem, both of Belgium

[73] Assignee: Alcatel N.V., Amsterdam, Netherlands

[21] Appl. No.: 701,844

[22] Filed: Feb. 15, 1985

[30] Foreign Application Priority Data

Feb. 21, 1984 [BE] Belgium ................ 2/60343

[51] Int. Cl.⁴ .................... H04Q 11/04; H04J 3/00
[52] U.S. Cl. .................................. 370/58; 370/67; 370/91; 379/279
[58] Field of Search ............... 370/58, 60, 67, 91; 379/279

[56] References Cited

U.S. PATENT DOCUMENTS 4,020,290  4/1977  Perna et al. .............. 370/58
4,442,502  4/1984  Friend et al. ............. 370/67
4,512,011  4/1985  Turner .................... 370/58
4,530,086  7/1985  Bogan et al. ............. 370/58
4,547,880  10/1985  Devita et al. ............ 370/58
4,603,415  7/1986  Nakada et al. ........... 370/58

Primary Examiner—Douglas W. Olms
Assistant Examiner—Frank M. Scutch, III
Attorney, Agent, or Firm—Peter C. Van Der Sluys

[57] ABSTRACT

A telecommunication switching system including a plurality of terminal circuits each associated with a common control device. The common control device is coupled to a switching network through two interface circuits which operate asynchronously. The control device includes a processor and control means to successively allocate the processor to each of the terminal interface circuits. This uniquely simple solution requires only one control device while providing the high reliability that may be achieved through the use of two interface circuits.

10 Claims, 6 Drawing Figures

TELECOMMUNICATION SWITCHING SYSTEM

The present invention relates to a telecommunication switching system including a plurality of terminal circuits with a common control device coupled through an interface circuit with a switching network.

Such a system is already known from Belgian Pat. No. 894 422 (R.C.W. CHEA et al 8-7-5-2-5-2). U.S. Pat. No. 4,456,991 issued June 26, 1984. A drawback of this known system is that upon failure of an interface circuit the associated terminal circuits, e.g. telecommunication lines, are out of service. A possible solution to increase the reliability would be to associate these lines to a plurality of the above common control devices and to couple the latter to the switching network each via an interface circuit. However, such a system would be relatively complicated and therefore expensive.

An object of the present invention is to provide a system of the above type, but presenting an increased reliability whilst remaining relatively simple.

According to the invention this object is achieved due to the fact that said common control device is coupled to said switching network via a plurality of said interface circuits operating asynchronously and that said common control device includes a processor and control means to successively allocate said processor to each of said interface circuits.

By the use of a plurality of interface circuits the reliability is increased and due to the fact that the interface circuits share the processor of the common control device the system remains relatively simple without the increased reliability being affected.

The above mentioned and other features of the invention will become more apparent and the invention itself will be best understood by referring to the following description of an embodiment taken in conjunction with the accompanying drawings in which:

FIG. 1 shows a telecommunication switching system according to the invention and including a common control device DPTC;

FIG. 2 schematically represents this control device in detail;

Figure 1:
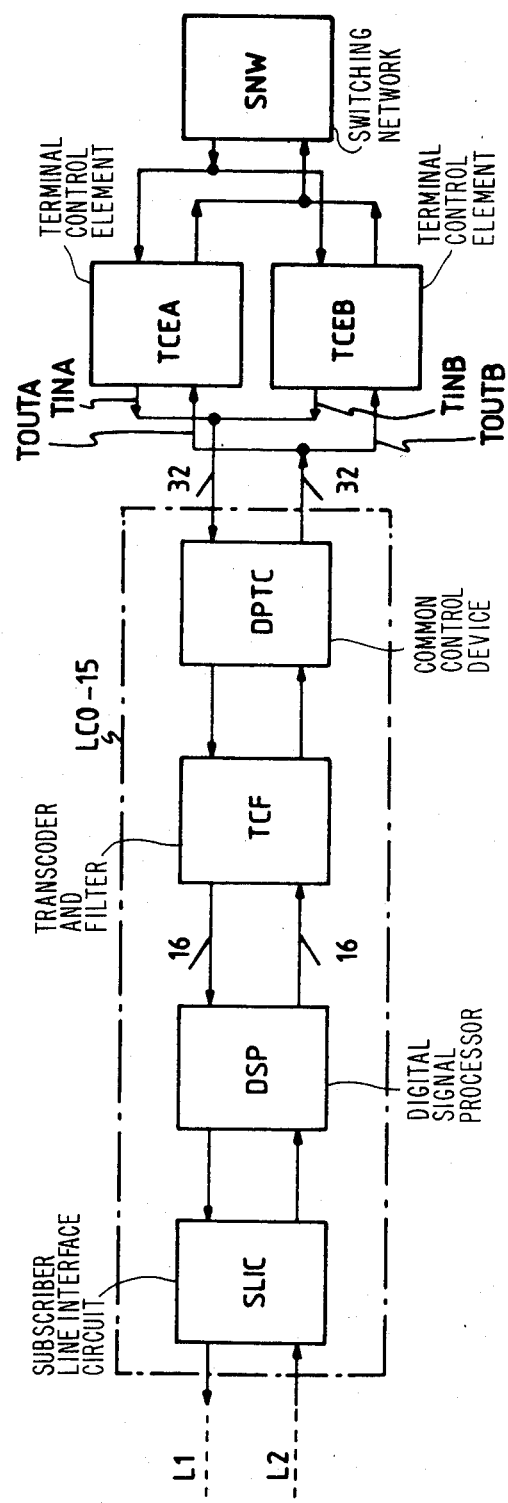

Principally referring to FIG. 1, the digital telecommunication switching system shown therein includes a plurality of groups of line circuits each group including a common control device DPTC. More particularly, each DPTC of 32 DPTCs is associated to a transcoder and filter circuit TCF and both are common to 16 line circuits LC0-15 each of which further includes a digital signal processor DSP and a subscriber line interface circuit SLIC which has access to a line such as L1, L2. In the switching system shown speech is translated into PCM words. The purpose of the transcoder and filter circuit TCF is to translate linear PCM words into companded PCM words and vice versa. The 16 digital signal processors DSP are mainly adapted to execute analog-to-digital and digital-to-analog conversion operations and the subscriber line interface circuits SLIC are able to perform line control and supervision. The above 32 DPTCs are coupled to a telephone switching network SNW via TDM links TINA/B and TOUTA/B and two terminal control elements TCEA and TCEB which are each of the type such as described in article "ITT 1240 Digital Exchange Hardware Description" by S. DAS et al, published in Electrical Communication, Volume 56, Number 2/3 of 1981 pp 135 to 147.

The 32 DPTCs forming a cluster are interconnected and the purpose of each of them is to serve as an interface between $32 \times 16 = 512$ lines or terminals and the two terminal control elements TCEA and TCEB. Data are transmitted between the DPTCs and these terminal control elements TCEA and TCEB via the above TDM links having terminals TINA, TOUTA, and TINB, TOUTB respectively. All these TDM links are operated at a frequency of 4.096 mega-Hertz and make use of frames of 125 microseconds, each frame comprising 32 channels and each channel comprising 16 time slots. As will be described later the purpose of the present control device is to control the transfer of control data via channel 16 between the DPTCs and alternately TCEA and TCEB.

Figure 2:
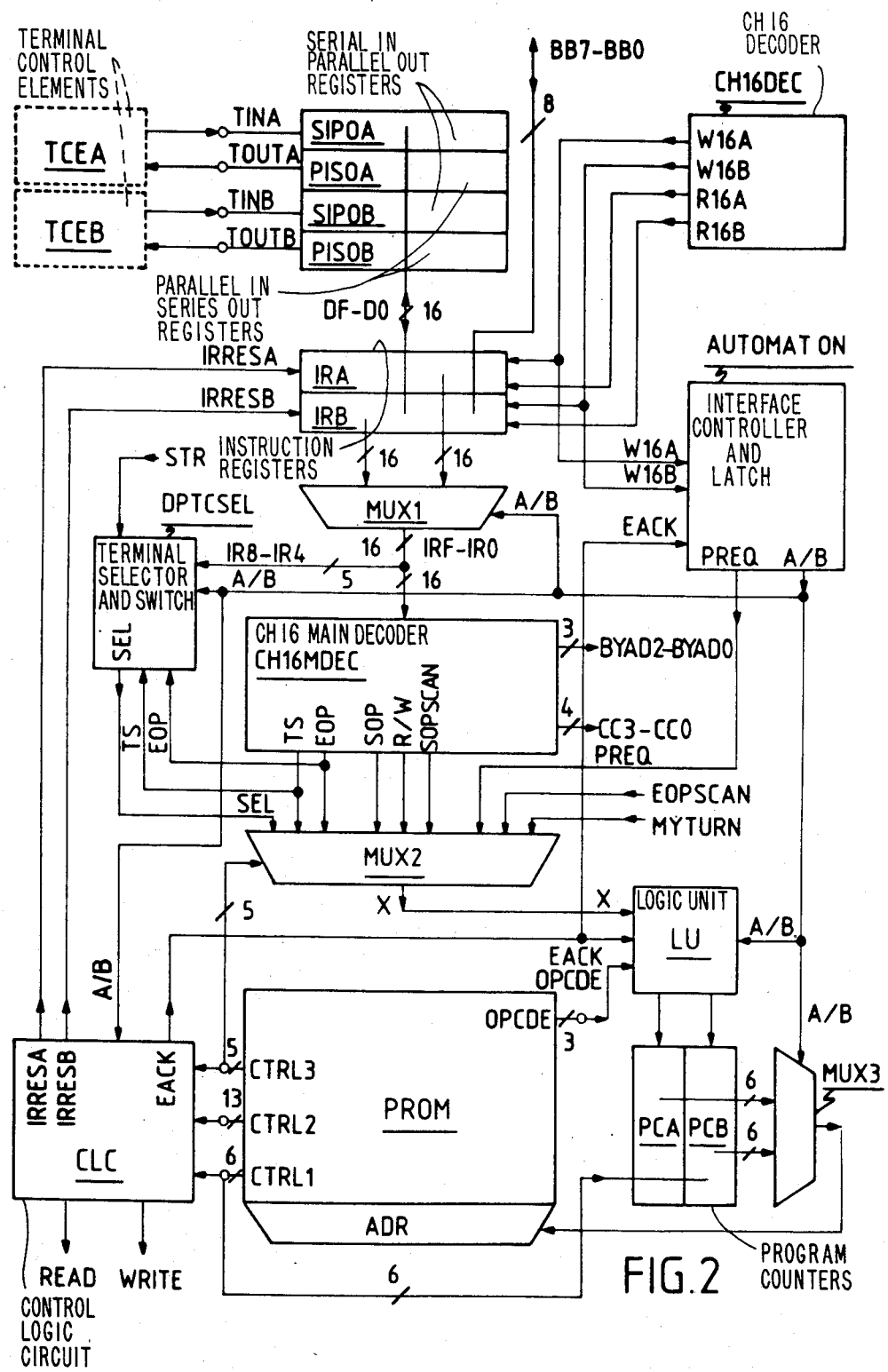

Refference is now made to FIG. 2 which shows various elements of a DPTC integrated on a chip and which are interconnected as shown.

Serial-in-parallel-out register SIPOA and SIPOB have input terminals TINA and TINB which are respectively connected via the above like-named TDM links to the terminal control elements TCEA and TCEB, whilst parallel-in-serial-out registers PISOA and PISOB are connected to TCEA and TCEB via output terminals TOUTA and TOUB respectively and through the above like-named TDM links. These four registers are connected to two instruction registers IRA and IRB by a 16 bit data bus DF-D0. The transfer of data between the above registers is performed by control signals generated by a channel 16 decoder CH16DEC of the DPTC. These signals are:

W16A to read data from SIPOA and write them in IRA;

R16A to read data from IRA and write them in PISOA;

W16B to transfer data from SIPOB to IRB;

R16B to transfer data from IRB to PISOB.

The two instruction registers IRA and IRB also have inputs controlled by reset signals IRRESA and IRRESB which when activated make the contents of these registers IRA and IRB equal to 0 respectively. Furthermore, IRA and IRB are connected via an 8 bit bus BB7-BB0 to other circuitry (not shown) of the DPTC including e.g. control registers, a dynamic RAM for storing line drive and scan bytes and FIFOs for storing mismatch data. These circuits are described in more detail in the copending Belgian Pat. No. 898 959 of even date and entitled "Telecommunication switching system and priority arrangement used therein".

A register selector MUX1 is connected to the instruction registers IRA and IRB via two respective 16 bit busses and has outputs constituted by another 16 bit bus IRF-IR0. This register selector MUX1 is controlled by a selection signal A/B which indicates whether the DPTC works for its A side, i.e. TCEA, IRA, or for its B side, i.e., TCEB, IRB. In function of the logical value 1 or 0 of the selection signal A/B, the contents of IRA or those of IRB is provided at the output bus of MUX1 respectively.

A channel 16 main decoder and latching circuit CH16MDEC has inputs connected to the 16 bit bus IRF-IR0 and is adapted to receive the contents of the instruction register IRA or IRB selected by MUX1. Its purpose is to decode the operation code of the instruction contained in this instruction register and to provide an output signal corresponding to that code on a distinct one of its like-named output terminals SOP, TS, R/W, SOPSCAN and EOP. Moreover, when the instruction stored in the instruction registers contains data the latter are provided at either a 4 bit output bus CC3-CC0 or a 3 bit output bus BYAD2-BYAD0 of CH16MDEC, as will be explained more in detail later. The channel 16 main decoder and latching circuit CH16MDEC is also controlled by the above mentioned selection signal A/B. Two output signals of CH16MDEC, generated on the terminals TS and EOP thereof are supplied to a DPTC terminal selector and latching circuit DPTCSEL which is further controlled by the selection signal A/B, by the identity of the DPTC provided on inputs STR and by 5 bits IR8-IR4 provided on part of the 16-bit bus IRF-IR0. The purpose of this selector is to generate at its output a terminal select signal SEL, as will be explained later. This terminal select signal SEL, the above output signals SOP, TS, R/W, SOPSCAN, EOP of CH16MDEC, signals EOPSCAN and MYTURN generated by common line handlers of the DPTC (not shown) and a processor request signal PREQ provided by an interface controller and latching circuit AUTOMATON consititute the entires of an input multiplexor MUX2 which provides an output signal X under the control of a set of input control signals CTRL3 supplied thereat from output terminals CTRL3 of a 2 kilobit Programmed Read-Only Memory PROM. The signal X is injected into a logical unit LU to which the selection signal A/B, a signal provided at output terminals OPCDE of the PROM and an acknowledgement signal EACK generated by a control logic circuit CLC are also applied. The logical unit LU controls two program counters PCA and PCB which are both coupled to terminals CTRL1 of the PROM and whose outputs are connected to a program counter selector MUX3 which selectively outputs the contents of PCA or PCB in function of the value of the selection signal A/B.

The output of MUX3 is applied to an address decoder ADR associated to the programmed memory PROM which has sets of output terminals OPCDE, CTRL1, CTRL2 and CTRL3, the three last sets of which are connected to the above mentioned control logic circuit CLC together with the selection signal A/B. CLC generates at its outputs the above mentioned acknowledgement signal EACK and the instruction register reset signals IRRESA and IRRESB. At other outputs of CLC read and write signals are generated for the instruction registers IRA and IRB and the above mentioned other circuitry (not shown).

The above interface controller and latching circuit or AUTOMATON has input signals W16A and W16B generated by the channel 16 decoder CH16DEC and the input signal EACK supplied thereat from the control logic circuit CLC. The outputs of the AUTOMATON are the selection signal A/B and the processor request signal PREQ.

The functioning of the control device DPTC is explained hereinafter. Each DPTC has a dynamic RAM (not shown) for storing 7 bytes of drive information and 1 byte of scan information per line or terminal of the 16 lines or terminals to which the DPTC is associated. In addition it has control registers and also FIFOs for storing mismatch information MMI relating to these terminals, this mismatch information being obtained by comparison of new information obtained by scanning and previous information stored in a corresponding scan byte of the RAM.

Figure 3:
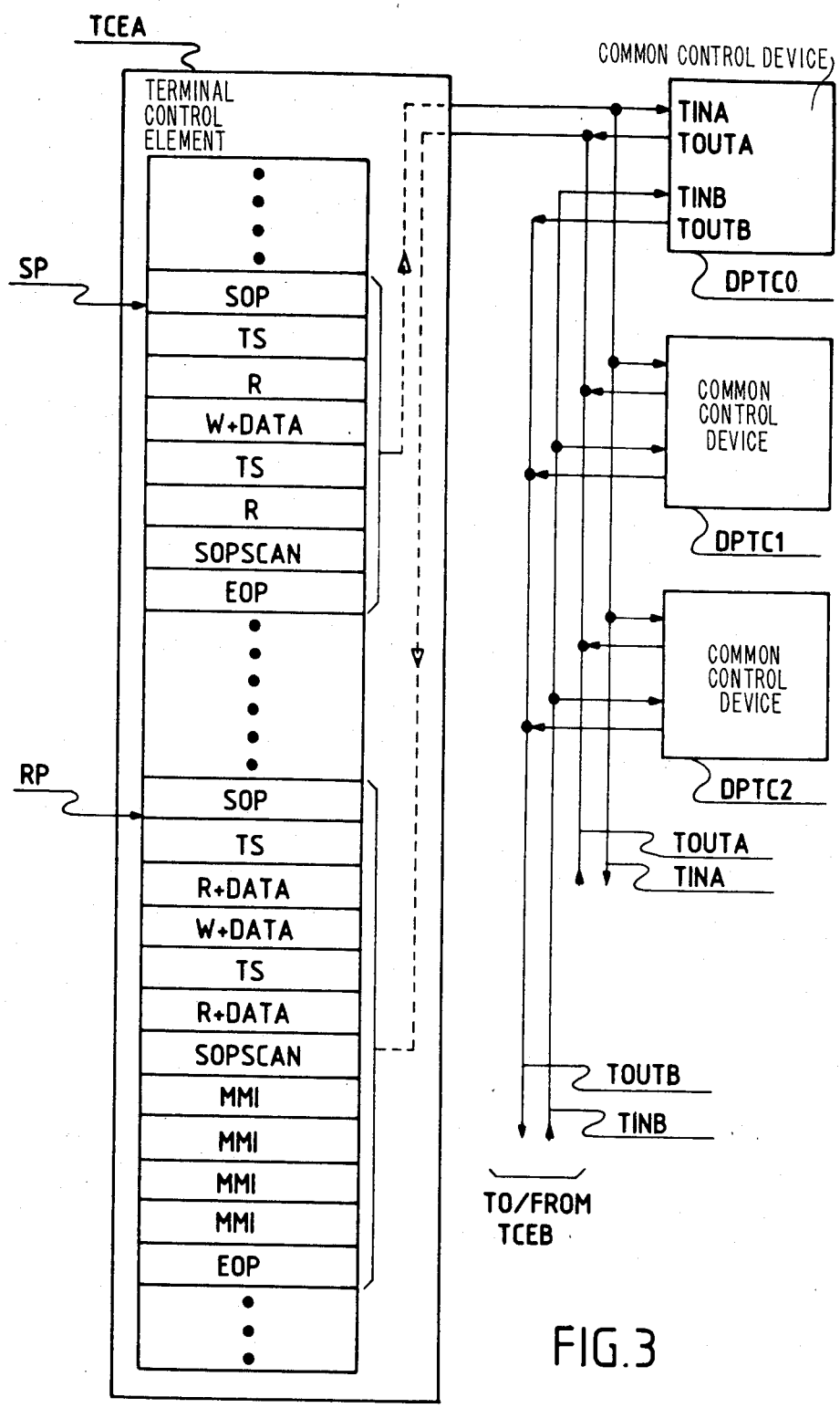
FIG. 3 is a diagram used to illustrate the operation of this control device.

Information is exchanged between the terminal control elements TCEA, TCEB and the DPTCs by means of packets transmitted via channel 16. For instance, a number of read and write commands for a number of lines and control registers of the DPTC may be transmitted in a single packet. FIG. 3 gives an example of such a transmission of information packets: a source packet SP is sent from TCEA via the TDM link TINA to the cluster DPTC0-31 and the information is returned word by word from the DPTCs to TCEA as a return packet RP via the TDM link TOUTA. The details of such transmission operation will be explained later.

The first word of a packet sent is always a "start-of-pocket" word, the last one is always an "end-of-packet" word and between these two words read and write commands are transmitted. Each group of such commands is preceded by a word which contains a code identifying it as a "terminal-selection" word and which also includes the DPTC identity and the address of the line or terminal for which the commands are intended. So, each word following a terminal-selection word and preceding another terminal-selection word or an end-of-packet word is considered as being related to the same terminal or to a control register of the DPTC. The read and write commands contain a data field and an address for the RAM or for a control register of the DPTC. The read commands are returned to the terminal control elements TCEA, TCEB with data inserted and the write commands are returned to TCEA, TCEB with the new register contents in the data field. Thus every word received from TCEA, TCEB gives rise to an action in the DPTC and causes one word to be sent in the return packet from the DPTC to TCEA, TCEB. Hence, normally a return packet has the same length as the corresponding source packet. However, if the source packet contains a "start-of-packet-scan" word immediately preceding an and-of-packet word, the possible MMIs contained in the FIFOs of the DPTCs are sent to the terminal control elements and in that case the length of the return packet may be larger than that of the source packet.

Referring again to FIG. 2, when a word is sent by TCEA or TCEB through channel 16 on the corresponding TDM link TINA or TINB, it is loaded into SIPOA or SIPOB respectively. At each occurence of channel 16 on the TDM links TINA or TINB, the channel 16 decoder CH16DEC applies a suitable write signal W16A or W16B to the respective instruction register IRA or IRB to load the contents of SIPOA or SIPOB into IRA or IRB respectively. The same signal W16A or W16B is also supplied to the AUTOMATON which latches this write signal and provides a corresponding selection signal A/B and, in function of the value of the signal EACK a processor request signal PREQ in order to activate the programmed memory PROM, as will be described later. As mentioned above, the selection signal A/B controls the register selector MUX1 and in function of this signal the contents of the corresponding instruction register IRA or IRB are applied to the channel 16 main decoder and latching circuit CH16MDEC. At the same time 5 selected bits of these contents are supplied to the DPTC terminal selector and latching circuit DPTCSEL via the output but IR8-IR4. The channel 16 main decoder and latching circuit CH16MDEC identifies the kind of the words transmitted by the terminal control element and provides output signals corresponding to the detected codes. The main output signals generated by CH16MDEC are SOP which indicates the presence of a start-of-packet word in the instruction register, TS for a terminal-selection word, R/W for a read or write command, SOPSCAN for a start-of-packet-scan word and EOP for an end-of-packet word. Furthermore, the address contained in a read or write command is provided on the 3 bit output bus BYAD2-BYAD0 of CH16MDEC.

In case a terminal-selection word is received, the channel 16 main decoder and latching circuit CH16MDEC provides a TS signal at its like-named output terminal and latches the terminal address contained in the terminal-selection word. This circuit is adapted to latch two terminal addresses because two packets may be simultaneously received from the A side and the B side of the DPTC respectively. Under the control of the selection signal A/B CH16MDEC provides at its 4 bit output bus CC3-CC0 the terminal address relating to the A side or to the B side of the DPTC. Furthermore, the output signal TS of CH16MDEC is sent to the DPTC terminal selector and latching circuit DPTCSEL in order to activate the latter. DPTCSEL then starts comparing the DPTC identity included in the terminal-selection word and transmitted to DPTCSEL on the 5 bis bus IR8-IR4 with the DPTC identity indicated at its inputs STR. If these two DPTC identities are equal DPTCSEL generates an internal terminal select signal. As for the CH16MDEC, two such internal terminal select signals may be latched in DPTCSEL but depending on the selection signal A/B, only one terminal select signal SEL is provided at the like-named output terminal of DPTCSEL. The comparison between the DPTC identities is done for each new terminal-selection word appearing in the instruction registers IRA and IRB and the terminal select signal SEL is de-activated when a signal EOP corresponding to an end-of-packet word is provided by CH16MDEC.

The signal SEL generated by DPTCSEL, the output signals SOP, TS R/W, SOPSCAN and EOP of CH16MDEC, the processor request signal PREQ generated by the AUTOMATON and signals MYTURN and EOPSCAN are applied to corresponding inputs of the input multiplexer MUX2. More in detail, the processor request signal PREQ is sent by the AUTOMATON at each occurrence of the signals W16A and W16B, i.e. for each channel 16 on the TDM links TINA and TINB respectively and when the acknowledgement signal EACK is received. The signal MYTURN indicates that this DPTC has been selected to transmit MMI to TCEA/TCEB and the signal EOPSCAN indicates that the MMI storing FIFOs of all the 32 DPTCs are empty or that the return packet has exceeded a predetermined length. These two signals are supplied by the common line handlers A and B associated to the A and B sides and described more in detail in the above mentioned copending patent application. One of the input signals of MUX2 is selected by means of the input control signals supplied by the terminals CTRL3 and appears as an output signal X of this multiplexer MUX2.

Figure 6:
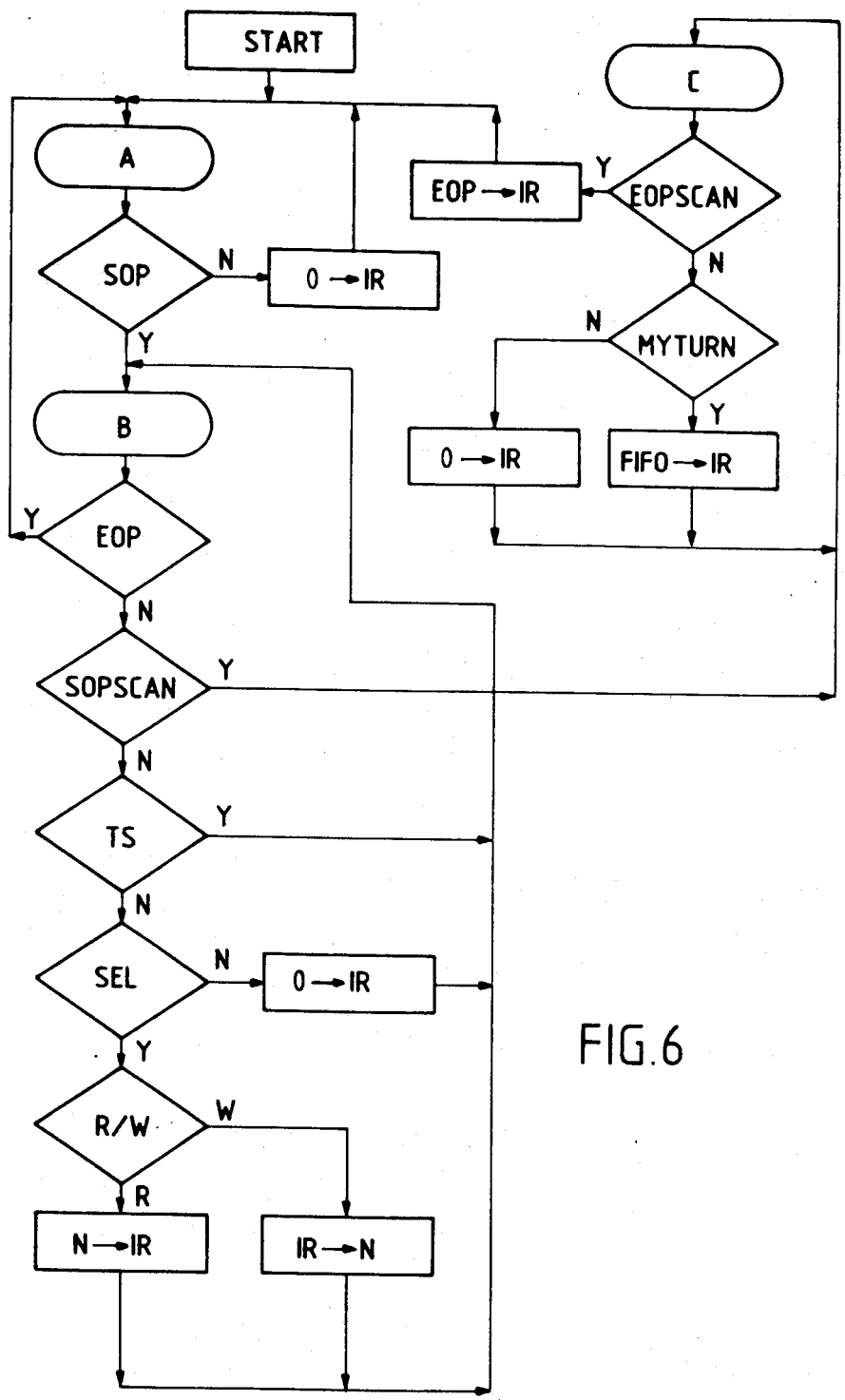
FIG. 6 is a flow chart showing the operations of the control device.

The programmed memory PROM manages the execution of the channel 16 commands in the DPTC and operates as shown in the symbolic flow-chart depicted in FIG. 6. The algorithm executed by the PROM has been fully sequentialized and the PROM uses the following set of instructions in its microprogramme: execute instructions and conditions jumps instruction which all have the same length, i.e. which are each composed of 27 bits.

In an execute instruction 3 bits are allocated to the operating code and identify the type of instruction, these bits being sent to the logical unit LU via output terminals OPCDE. In the case of an execute instruction with instruction number Ni, the number of the next following instruction is Ni+1 and since all the instructions have the same length, the address of Ni+1 is equal to the address of Ni incremented by the length of one instruction. The latter address is calculated and latched in the program counters PCA and PCB under the control of the logical unit LU which selects PCA or PCB depending on the selection signal A/B. The 24 remaining bits of an execute instruction are control signals sent to the control logic circuit CLC via the terminals CTRL1, CTRL2 and CTRL3 in order to provide at the output thereof signals controlling the execution of the read and write commands in the above mentioned other circuitry.

A conditional jump instruction also has a 3 bit operating code transmitted to LU via terminals OPCDE, but now only 13 bits are used as control signals and are sent to CLC via terminals CTRL2. They have the same purpose as the control bits of an execute instruction. From the 11 remaining bits, 5 bits are used as input control signals for the MUX2 and are transmitted to it via terminals CTRL3 in order that one of the inputs to MUX2 should appear as an output signal X of this multiplexer, whilst the 6 other bits constitute the address of a following instruction and are supplied to the program counters PCA and PCB via terminals CTRL1. For a conditional jump instruction with instruction number Ni, the number of the next instruction is dependent on the true or the false answer to the condition, this answer being defined by the value of the output signal X of the multiplexer MUX2. Under the control of this signal the logical unit LU decides whether the number of the next instruction is Ni+1 and will be calculated in the same way as for an execute instruction or Nj with j independent of i and whose address is given to the program counters PCA, PCB by the conditional jump instruction itself via the terminals CTRL1 of the PROM.

As mentioned above, the control logic circuit CLC provides command signals READ and WRITE controlling the execution of the read and write operations in the DPTC. For a write command to a control register of the DPTC, the address of the control register is given on the 3 bit bus BYAD2-BYAD0 supplied by CH16MDEC. For a write command of a line drive byte in the RAM, the line or terminal address is supplied on the 4 bit bus CC3-CC0 and the byte address is given on the 3 bit bus BYAD2-BYAD0, both addresses coming from CH16MDEC. The transfer of data from an instruction register IRA, IRB to a control register or to a RAM location is performed via the 8 bit bus BB7-BB0. For a read command, the same bus BB7-BB0 is used to load the contents of a control register or of a RAM location into the instruction register IRA or IRB. As for a write command, the line address is supplied on the 4 bit bus CC3-CC0 and the register address is given on the 3 bit but BYAD2-BYAD0. The selection between the A and the B side of the DPTC is always done by the AUTOMATON via its output selection signal A/B.

Under the control of the read signals R16A and R16B generated by the channel 16 decoder CH16DEC the return packet is formed by loading the contents of the suitable instruction register IRA or IRB into the parallel-in-serial-out register PISOA or PISOB respectively. Starting from PISOA and PISOB, the data are transmitted to the corresponding terminal control elements TCEA and TCEB via channel 16 of the TDM links TOUTA and TOUTB respectively.

Figure 4:
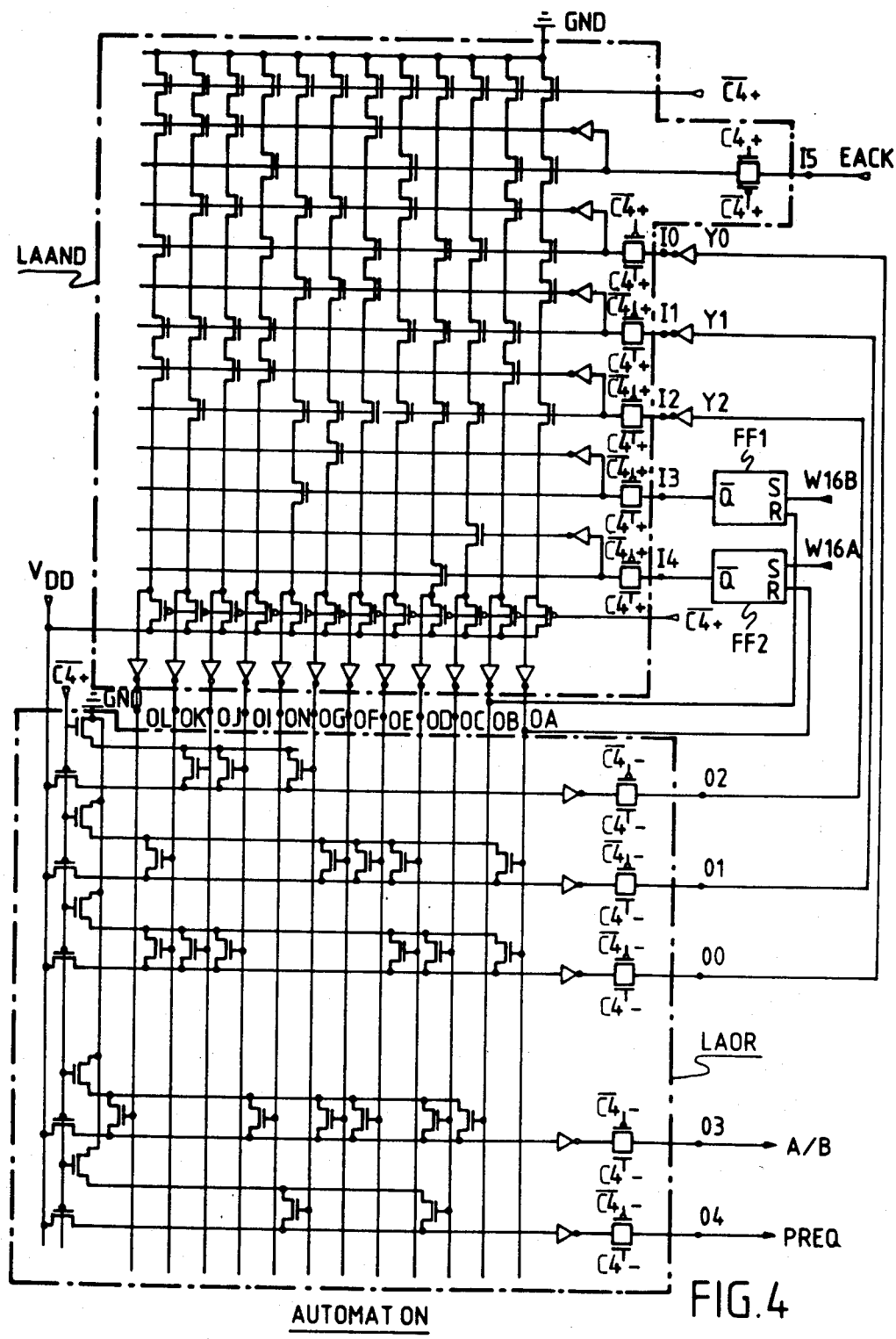
FIG. 4 shows the circuit AUTOMATON of FIG. 2 in detail.

The circuit of the interface controller and latching circuit or AUTOMATON is shown in detail in FIG. 4. It mainly includes a logical array of AND gates LAAND and a logical array of OR gates LAOR, the outputs of LAAND being connected to the inputs of LAOR. These two logical arrays are controlled by clock signals C4+, C4+, C4− and C4−, having a same frequency of 4.096 maga-Hertz, the signals C4+ and C4− being the respective complements of C4+ and C4−. Furthermore, the signal C4− is a square wave and C4+ is a rectangular wave with positive portions smaller than those of C4− and occurring in the middle of the negative portions of C4−.

The logical arrays are also connected to a supply terminal VDD=5 Volts and to a ground terminal GND. Each logical array is composed of rows and columns and includes MOS transistors, inverters and passing gates also called pass-transistors.

The PMOS transistors are schematically represented with a little circle on their gate electrode. The passing gates are constituted by a NMOS transistor and a PMOS transistor whose source and drain electrodes are interconnected and whose gate electrodes are controlled by the suitable complementary clock signals C4+, C4+ or C4−, C4−.

In the LAAND the rows are connected to input terminals I0 to I5 via passing gates controlled by C4+ and C4+ and the columns are connected to output terminals OA to OL via inverters. There are two rows allocated to each input signal : a first row is controlled by the input signal itself and a second row is controlled by the inverse of this input signal obtained by means of an inverter having its input connected to the first row and its output connected to the second row. Each column of the LAAND is composed of several NMOS transistors which will hereinafter be called function transistors connected in series via their source-to-drain paths and whose gate electrodes are each connected to a suitable row in order to perform the desired AND function at the column output.

Furthermore, the LAAND has also two control rows. A first control row is constituted by PMOS transistors, one at each column intersection, having their drain electrodes connected to the supply terminal VDD and their source electrodes connected to one end of the corresponding columns. These latter column ends are connected to respective output terminals OA to OL of the LAAND via output inverters. The gate electrodes of these PMOS transistors are all connected to this first control row which is itself directly controlled by the clock signals C4+. A second control row is constituted by NMOS transistors, also one per column, having their drain electrodes connected to the other end of the corresponding columns. The source electrodes of these transistors are connected to the ground terminal GND and their gates are all connected to this second control row which is itself directly controlled by the clock signal C4+.

The output terminals OA to OL of the LAAND array correspond respectively to the like-named input terminals of the LAOR array. In the LAOR array, each input terminal OA to OL is connected to a column and the output terminals O0 to O4 are connected to the rows via the series connections of inverters and passing gates controlled by the clock signals C4− and C4−. Each row is also connected to VDD via the source-to-drain path of a PMOS transistor to the gate electrode of which the clock signal C4+ is applied. The OR functions performed at the output terminals O0 to O4 are realized by means of several NMOS function transistors placed at suitable cross-points of the rows and the columns. Each of these NMOS function transistors has its drain electrode connected to the row and its gate electrode connected to the crossing column, whilst the source electrodes of all these transistors are grounded via the drain-to-source paths of NMOS transistors having their gate electrodes controlled by the clock signal C4+.

The external inputs of the AUTOMATON are the acknowledgement signal EACK supplied at input terminal I5 of the LAAND and the write signals W16A and W16B which are supplied to the set inputs S of RS flip-flops FF1 and FF2 respectively. The reset inputs R of these RS flip-flops FF1 and FF2 are connected to the output terminals OA and OB of the LAAND respectively, whilst the inverted outputs $\overline{Q}$ of FF1 and FF2 are respectively connected to the input terminals I3 and I4 of the LAAND. The outputs of the AUTOMATON are the selection signal A/B provided at output terminal O3 and the processor request signal PREQ provided at the output terminal O4 of the LAOR. The internal signals Y0, Y1 and Y2 of the AUTOMATON provided at the respective output terminals O0, O1 and O2 of the LAOR are inverted and re-injected into the LAAND via the input terminals I0, I1 and I2 respectively.

When the clock signal C4+ is low, the AUTOMATON is in a so-called "precharge" state. The output terminals OA to OL of the LAAND are then at the logical value 0 due to the potential VDD, i.e. a logical 1, which is applied to these output terminals via the drain-to-source paths of the PMOS transistors of the first control row of the LAAND and the output inverters, whilst the input signals supplied at the terminals I0 to I5 of the LAAND are validated and transmitted to the gate electrodes of the NMOS function transistors owing to the closed passing gates. Furthermore, the rows of the LAOR are at the potential VDD supplied at the like named terminal and transmitted to these rows via the drain-to-source paths of the PMOS transistors of the LAOR. This potential VDD is not transmitted to the output terminals of the LAOR because the passing gates of the latter are open.

The next state corresponds to a high value of the clock signal C4+ and is called "evaluation" state. Since the passing gates of the LAAND are now open, the input signals are no longer transmitted to the rows of the LAAND and the potential at the gate electrodes of the corresponding function transistors remains at the value defined in the precharge state. Every column of the LAAND is now disconnected from terminal VDD and is connected to the ground terminal GND. In the LAAND, the ground potential GND is transmitted to the output terminals OA to OL via the respective columns each constituted by a conducting NMOS transistor of the second control row, the NMOS function transistors performing the AND function of the column and an output inverter. Hence, when all the function transistors of a column are conducting, i.e. when a logical value 1 is applied to their gate electrodes, the logical value of the signal at the corresponding output terminal is on 1. Furthermore, the input terminals OA to OL of the LAOR have valid input signals and the signals at the output terminals O0 to O4 of LAOR are also valid because the passing gates are closed and the NMOS function transistors of the LAOR are operating normally since their source electrodes are connected to the ground terminal GND.

Figure 5:
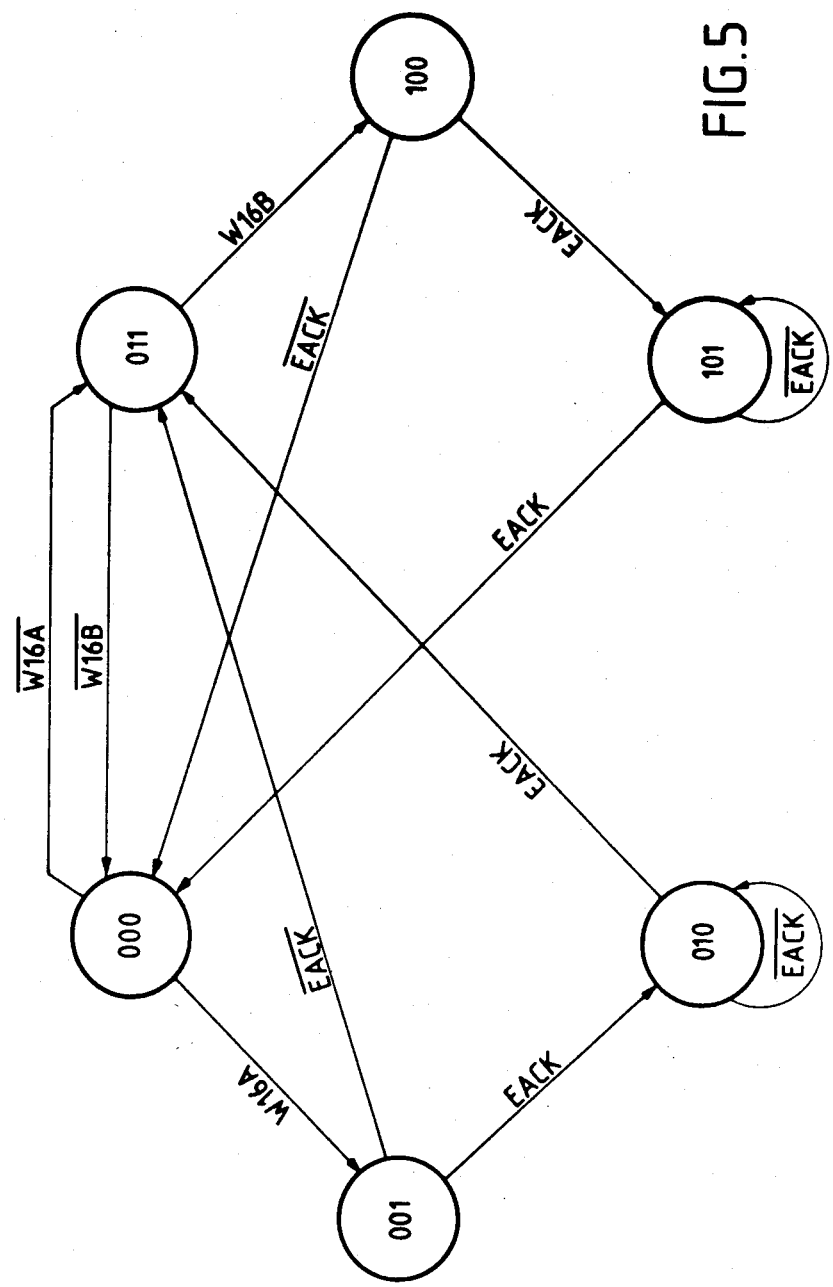
FIG. 5 shows the state diagram of this AUTOMATON.

At the following clock change, which is again a precharge state, the previous output signals Y0 to Y2 of the LAOR are inverted and re-injected into the LAAND via the input terminals I0 to I2 respectively. The internal signals Y0, Y1 and Y2 of the AUTOMATON control the functioning of the processor of the DPTC. This processor includes the programmed memory PROM and the circuitry associated thereto, i.e. the address decoder ADR, the program counters PCA and PCB, the program counter selector MUX3 and the digital unit LU. The operation of the AUTOMATON is now described by making reference to FIG. 4 and to the state diagram of FIG. 5. In this latter figure the three digits inside the circles indicate the logical value of the three internal signals Y2, Y1 and Y0 which are provided at the terminals O2, O1 and O0 of the AUTOMATON respectively. A low value of a signal, i.e. the ground potential GND, is indicated by the logical state 0, whilst a high value of a signal, i.e. the potential VDD=5 Volts, is indicated by the logical state 1. As mentioned above, the progression of the signals in the AUTOMATON is performed at every positive pulse of the clock signal C4+.

When the AUTOMATON is in an idle state for the A side of the DPTC the signals Y2, Y1 and Y0 all three have the logical value 0 and since these signals are inverted between the output terminals O2, O1 and O0 of the LAOR and the input terminals I2, I1 and I0 of the LAAND respectively, the logical states at these input terminals are then all 1. If furthermore, no write signal W16A or W16B is provided by the channel 16 decoder CH16DEC, a logical state 1 is supplied to both the input terminals I3 and I4. In these conditions the states of all the output terminals OA to OL of the LAAND are 0 except for terminal OD which is on 1. The consequence of this situation is that the output signal PREQ at terminal O4 of the LAOR is 0, i.e. there is no processor request, and that the output signal A/B at terminal O3 is also 0, this latter signal indicating that the AUTOMATON is now able to work for the B side of the DPTC. Moreover, the output terminals O2, O1 and O0 are now on 0, 1 and 1 respectively. This state is represented in the upper right circle of FIG. 5 and corresponds to an idle state for the B side of the DPTC. In this case, the values 1, 0 and 0 are present at the input terminals I2, I1 and I0 respectively. If the write signals W16A and W16B are still 0, the output terminals OA to OL of the LAAND are all on 0, except for terminal OH which is on 1. As a result, the output signal PREQ is still 0 but the selection signal A/B is now 1 indicating that the AUTOMATON is now able to work again for the A side of the DPTC. The output signals at the terminals O2, O1 and O0 of the LAOR are now all 0. Thus the AUTOMATON is back in its original state where Y2, Y1 and Y0 are all three on 0. As mentioned above, the states 000 and 011 represent the idle states for the A and the B sides of the DPTC respectively and in the absence of the write signals W16A and W16B the AUTOMATON oscillates between these two idle states selecting alternately the A and the B sides of the DPTC.

When a write signal, e.g. W16A, is provided by CH16DEC, it is latched by the RS flip flip FF1 of the AUTOMATON which then switches from the idle state 000 to the state 001 because terminal OC is activated (1), the other output terminals of the LAAND being all on 0. The value 1 at terminal OC gives rise to another value 1 at the output terminals O3 and O4 of the LAOR. This means that the A side of the DPTC is now selected (signal A/B=1) and that the processor request signal PREQ is activated (signal PREQ=1). This causes the operation of the above processor explained more in detail later.

In response to the signal PREQ the AUTOMATON expects an acknowledgement signal EACK from the control logic circuit CLC coupled to the programmed memory PROM. This acknowledgement signal EACK indicates that the processor is able to accept new inputs. If no acknowledgement signal is provided, i.e. if signal EACK=0, only the output terminal OK of the LAAND is brought on 1 so that the AUTOMATON goes from the state 001 to the idle state 011. From there the AUTOMATON tries to start oscillating between the idle states B and A, but when it reaches the state 000 and since the write signal W16A is still latched in the RS flip flop FF1 the next following state is again 001 and a new processor request signal PREQ is sent to the control logic circuit CLC. The same way as described above is followed until an acknowledgement signal EACK is received by the AUTOMATON while it is in the state 001. In that case, the next following state is 010 because only the output terminal OE of the LAAND is on 1. In the state 010 the selection signal A/B is still on 1 but the processor request signal PREQ is reset to 0 and since the processor is now executing some operations, the acknowledgement signal EACK is also reset to 0 by the control logic circuit CLC.

The AUTOMATON remains in the state 010 until a new acknowledgement signal EACK is provided by CLC. As long as EACK is on 0, only the output terminal OF of the LAAND is on 1 and the state remains 010. This means that the processor is still running. When a signal EACK is supplied by CLC, i.e. when the processor has completed a group of operations as will be explained below, the AUTOMATON goes to the state 01 because the terminal OA is on 1 and the oscillation between the idle states for the A side and for the B side of the DPTC starts again. Moreover, the value 1 at the reset input R of the RS flip flop FF1 transmitted thereon via terminal OA provides a logical value 1 at the output terminal $\overline{Q}$ of FF1 and de-activate the latched write signal W16A.

A sequence of operation for the B side of the DPTC which follows the way 011, 100, 101 and 000 is similar to the above described sequence 000, 001, 010 and 011 for the A side of the DPTC. Therefore it will not be described more in detail.

The processor executes a sequence of operations which is schematically represented in the flow chart of FIG. 6.

Referring to this flow chart, after a power-up START, the processor starts running in a loop and goes first to a "wait state" A. There are three possible wait states A, B and C each corresponding to a breakpoint of the operations of the processor. When the processor reaches one of these wait states, an acknowledgement signal EACK is generated by its associated control logic circuit CLC. This signal EACK is sent to the logical unit LU in order to block the program counter PCA or PCB according to the value of the selection signal A/B and is also transmitted to the AUTOMATON which resets the RS flip flop FF1 or FF2 wherein the corresponding write signal W16A or W16B was latched. The AUTOMATON is reset to one of its idle states 000 and 011, as explained above. The signal EACK indicates to the AUTOMATON that the processor is in the rest condition and is able to accept a new processor request signal PREQ from the AUTOMATON as will be described later. The actual wait state A, B or C is memorized in the program counter PCA or PCB so that the next processor request signal PREQ supplied by the AUTOMATON may be either for the A side or for the B side of the DPTC.

The processor request signal PREQ and a suitable selection signal A/B are generated by the AUTOMATON upon the receipt of a write signal W16A or W16B from the channel 16 decoder CH16DEC and when the acknowledgement signal EACK is available. The purpose of the signal PREQ is to restart the processor and therefore this signal is sent to the logical unit LU via the input multiplexer MUX2. A write signal W16A or W16B causes the AUTOMATON to switch from its idle state 000 or 011 to the state 001 or 100 respectively. When the AUTOMATON is in the state 001 or 100 and the processor is in a wait state the PROM ensures, by means of signals transmitted via the terminals CTRL3, the selection of the processor request signal PREQ applied to the input multiplexer MUX2 by the AUTOMATON. The corresponding output signal X of MUX2 is then transmitted to the logical unit LU controlling the operation of the program counter PCA or PCB according to the state 001 or 100 of the AUTOMATON respectively.

As described above, if in the state 001 or 100 no acknowledgement signal EACK is received by the AUTOMATON in response to its processor request signal PREQ, it returns to the idle state 011 or 000 respectively. On the contrary, if the acknowledgement signal EACK is supplied the following state of the AUTOMATON becomes 010 for the A side or 101 for the B side of the DPTC. In these last states the processor request signal PREQ is de-activated and no acknowledgement signal EACK is provided as long as the processor is running. The acknowledgement signal EACK is again generated by the control logic circuit CLC when the processor has completed a group of operations and is back in a wait state. In reaction to this acknowledgement signal EACK, the AUTOMATON returns to one of its idle states 000 and 011 and does no longer latch the corresponding write signal W16A or W16B.

In FIG. 6, the execute instructions of the PROM are indicated by a rectangle, the conditional jump instructions are represented by a diamond and the wait states are represented by an oval shaped drawing.

Starting from the wait state A with the processor in the rest condition, when channel 16 appears on the TDM link TINA or TINB, the write signal W16A or W16B is activated by the channel 16 decoder CH16DEC and a word of the source packet is loaded in the instruction register IRA or IRB respectively. The AUTOMATON sets the selection signal A/B to the corresponding value and jumps from the idle state 000 or 011 to the state 001 or 100 according to this selection signal A/B. Furthermore, the AUTOMATON sends the processor request signal PREQ to the processor via the input multiplexer MUX2. In return, the processor sends an acknowledgement signal EACK to the AUTOMATON via the control logic circuit CLC which forces the AUTOMATON to go from the state 001 or 100 to the state 010 or 101 respectively. The processor request signal PREQ and the acknowledgement signal EACK are then de-activated and the processor executes the instructions shown in the flow chart.

More in detail, a wait state is in fact a special conditional jump instruction whose 13 bits which are used as control signals are sent to the control logic circuit CLC via terminals CTRL2. In response thereto the CLC issues an acknowledgement signal EACK which is sent on the one hand to the logical unit LU with the purpose of blocking the corresponding program counter PCA or PCB according to the selection signal A/B and on the other hand to the AUTOMATON in order to indicate that the processor is now in the rest condition and may accept a new processor request signal PREQ. The 5 bits of this conditional jump instructions which are transmitted via terminal CTRL3 are used as input control signals for selecting the input PREQ of the input multiplexer MUX2 in order to detect thereon a like named processor request signal PREQ. The processor remains blocked on that instruction location until such a signal OREQ is supplied by the AUTOMATON. In that case, the corresponding program counter PCA or PCB provides the next following instruction address of the programmed memory PROM in order to jump thereto.

The first instruction of the PROM after the wait state A is a conditional jump instruction SOP which tests whether or not the word present in the instruction register IRA or IRB is a start-of-packet word. To accomplish this test, the 5 input control bits of this conditional jump instruction SOP are supplied via the output terminals CTRL3 to the input multiplexer MUX2 which accordingly selects the input terminal SOP. The signal at this terminal is then transmitted as signal X to the logical unit LU. Accordingly to the value of this signal X the logical unit LU allows the program counter PCA or PCB to jump to the address of the next following instruction in the PROM or to an instruction whose address is given by the 6 address bits of the conditional jump instruction SOP and transmitted to PCA or PCB via the terminals CTRL1.

If the tested word is not a start-of-packet word the exist of the conditional jump instruction SOP is no N. In this case the contents of IRA or IRB are not validated and reset to 0 by the output signal IRRESA or IRRESB respectively of the control logic circuit CLC in response to the execute instruction 0→IR of the PROM. After this operation the processor jumps again to the wait state A by means of a jump instruction (not shown) containing the address of the special conditional jump instruction mentioned above and corresponding to this wait state A. Furthermore the AUTOMATON returns to its idle state 011.

Alternatively, if the tested word is a start-of-packet word, the exist of the conditional jump instruction SOP is yes Y and the processor is stopped in the wait state B. An acknowledgement signal EACK is sent by CLC to the AUTOMATON which therefore changes from the state 010 or 101 to the idle state 011 or 000. The start-of-packet word of the source packet coming from the terminal control element TCEA or TCEB is validated and echoed to TCEA or TCEB by the return packet via the register PISOA or PISOB and channel 16 of the TDM link TOUTA or TOUB respectively. This transmission operation is controlled by the read signal R16A or R16B generated by the channel 16 decoder CH16DEC. At the next occurrence of the write signal W16A or W16B the following word of the source packet sent by TCEA or TCEB is loaded in the instruction register IRA or IRB via the TDM link TINA or TINB and the register SIPOA or SIPOB respectively. The AUTOMATON switches then again from the idle state 000 or 011 to the state 001 or 100 and sends the processor request signal PREQ to the processor. Since the latter is not running (signal EACK=1) it accepts the processor request signal PREQ and the new state of the AUTOMATON becomes 010 or 101. The processor starts now from the wait state B of the flow chart of FIG. 6 and its first operation is a conditional jump instruction EOP.

If the word is an end-of-packet word a positive answer Y is provided at the output of the conditional jump instruction EOP and processor is brought back in the wait state A of the flow-chart. A signal EACK is sent by CLC to the AUTOMATON which returns to one of its idle states. The end-of-packet word is echoed to TCEA or TCEB by the return packet.

Alternatively, if the word is not an end-of-packet word a negative answer N is provided at the output of the conditional jump instruction EOP and the next instruction is another conditional jump instruction SOPSCAN which tests whether or not the received word is a command to transmit the MMIs contained in the FIFOs of the DPTC to the corresponding terminal control elements.

If the word is a start-of-packet-scan word the answer to the conditional jump instruction SOPSCAN is yes Y and the MMIs contained in the FIFOs of the DPTC will be transmitted to TCEA or TCEB as will be described more in detail later.

Alternatively, if the word of the source packet is not a start-of-packet-scan word, the answer to the conditional jump instruction SOPSCAN is no N and the processor performs another conditional jump instruction TS. This instruction tests whether or not the word loaded in the instruction register IRA or IRB is a terminal-selection word.

If the tested word is a terminal selection word, the answer to that question TS is yes Y and the AUTOMATON goes back to its idle state after having received the acknowledgement signal EACK from the processor, the breakpoint in the flow-chart is again the wait state B. Furthermore, the address of the terminal to select is extracted from the terminal-selection word by the channel 16 main decoder and latching circuit CH16MDEC where it is latched and the terminal select signal SEL indicating that a terminal is now selected is generated by the DPTC terminal selector and latching circuit DPTCSEL where it is also latched.

Alternatively, if the tested word is not a terminal-selection word, a negative response N is provided as output to the conditional jump instruction TS and the next following instruction is again a conditional jump instruction SEL. This conditional jump instruction SEL asks whether or not a terminal was already selected by checking the input signal SEL of the input multiplexer MUX2.

If a terminal was already selected by one of the previous words of the source packet, the answer to the question SEL is yet Y and the following instruction is another conditional jump instruction R/W which tests whether it is a read or write command.

If no terminal was selected by a previous instruction of this source packet, the answer to the question SEL is no N and the word contained in the instruction register IRA or IRB can not be validated. In this case, the next operation of the processor is to perform an execute instruction 0→IR which resets the contents of the instruction register IRA or IRB to zero by means of the respective output signal IRRESA or IRRESB generated by the control logic circuit CLC. This indication of no validity in the instruction register IRA and IRB is echoed to the corresponding terminal control element TCEA or TCEB by the return packet. Finally, the programmed memory PROM returns to its wait state B.

As mentioned above, in the case of a positive answer Y to the question SEL, the next following instruction R/W tests whether it is a read or a write command.

In the case of a read command the answer to the question R/W is "read" R and under the control of the following execute instruction N→IR of the PROM, the DPTC has to load the contents of one of its RAM locations or of one of its registers in the instruction register IRA or IRB in order to transmit these data to TCEA or TCEB by the return packet. As already mentioned, the RAM location is addressed by the line or terminal address supplied on the output bus CC3–CC0 and by the byte address which is provided on the output bus BYA2–BYAD0 of the channel 16 main decoder and latching circuit CH16MDEC while the data are transferred on the 8 bit bus BB7–BB0. After these operations, the processor jumps again to the wait state B and the AUTOMATON oscillates between the idle states 000 and 011 after having de-activated the corresponding latched write signal W16A or W16B.

Alternatively, if the tested word is a write command which contains also data the conditional jump instruction R/W exits with a "write" signal W. Under the control of the next execute instruction IR→N, the data contained in the write command are loaded via the bus BB7→BB0 in the correct control register or RAM location of the DPTC by means of the address as given on the busses CC3–CC0 and BYAD2–BYAD0. The terminal or line address available on the bus CC3–CC0 is correct since the conditional jump instruction R/W can only be performed after a positive response Y to the previous conditional jump instruction SEL. Thus, a terminal is always selected when a conditional jump instruction R/W is performed. The final wait state in the flow-chart is also B.

As mentioned above, if a start-of-packet-scan word is present in the instruction register IRA or IRB when the conditional jump instruction SOPSCAN is performed, another group of instructions will be executed to load the MMIs contained in the FIFOs of the DPTC in the instruction register IRA or IRB. More in detail, after an affirmative response Y to the question SOPSCAN, the processor jumps to the wait state C. From there and until an end-of-packet word will be supplied to the return packet, no word coming from the source packet of TCEA or of TCEB can be validated; of course, this is only true for the corresponding side of the DPTC and the possible corresponding write signals W16A or W16B from the channel 16 decoder CH16DEC are latched in the AUTOMATON. At the next occurrence of channel 16 on the TDM link TINA or TINB, the write signal W16A or W16B generated by CH16DEC causes a processor request signal PREQ to be sent by the AUTOMATON in response to the acknowledgement signal EACK of the processor. As a result, the processor performs the conditional jump instruction EOPSCAN which follows immediately the wait state C of the flow chart. This instruction checks whether an end-of-packet-scan signal EOPSCAN is provided at the like name terminal of the input multiplexer MUX2.

If the end-of-packet-scan signal EOPSCAN supplied by the corresponding common line handler is present, it is transmitted to the logical unit LU by the multiplexer MUX2 via its output signal X. The answer to the question EOPSCAN is then yes Y and the processor jumps to an execute instruction EOP→IR which provokes the load of an end-of-packet word in the instruction register IRA or IRB in order to send it to the respective terminal control element TCEA or TCEB by the return packet. In fact, an end-of-packet-word corresponds to the logical value 0 so that the loading of this word is an instruction register IRA or IRB can be performed by the output signal IRRESA or IRRESB of the control logic circuit CLC. This end-of-packet word loaded in the return packet indicates that the FIFOs for that side of the DPTCs are empty or that the return packet has exceeded its maximum length. The final position in the flow chart is the wait state A so that the processor may accept a new source packet from TCEA or TCEB and validate the possible write signals W16A or W16B latched in the AUTOMATON.

Alternatively, if no signal EOPSCAN is provided the answer to the question EOPSCAN is no N and the following instruction is a conditional jump instruction MYTURN which tests whether or not the signal MYTURN is activated. The signal MYTURN is also generated by the corresponding common line handler according to the actual selection signal A/B and indicates that this DPTC is now selected to send the MMIs contained in its FIFO to the corresponding terminal control element TCEA or TCEB.

If the signal MYTURN is active, the answer to the question MYTURN is yes Y and the contents of the FIFO for the A side or for the B side of the DPTC are loaded in the corresponding instruction register IRA or IRB. This operation is controlled by the next following execute instruction FIFO→IR. For the return packet, the output frequency of the data is at maximum one MMI byte per channel 16 on the TDM link TOUTA or TOUTB.

Alternatively, if the signal MYTURN is not active the answer to the question MYTURN is no N and the instruction register IRA or IRB of this DPTC is filled with 0 under the control of the output signal IRRESA or IRRESB of the control logic circuit CLC. This operation is controlled by the next following execute instruction 0→IR.

In both cases, the final point in the flow chart is the re-wait state C and, as mentioned above, an end-of-packet-scan word is necessary to complete the FIFO scanning.

Between 2 wait states, the duration of the operations of the processor is calculated so that they will be completed for the 2 possible write signals W16A and W16B before any new write signal will be generated by the channel 16 decoder CH16DEC.

The sequence of the operations in the flow chart of FIG. 6 will be best illustrated by means of an example of pocket transmission such as the one shown in FIG. 3.

Such as mentioned above, after a power-up START, the processor jumps to its first wait state A. The first word appearing in the source packet SP that comes from TCEA is a start-of-packet word. The instruction of the programmed memory PROM following immediately the wait state A is a conditional jump instruction SOP so that the answer to that question is yes Y. The processor ends then in the wait state B and a start-of-pocket word is echoed to TCEA by the return packet RP at the next occurrence of the read signal R16A.

The second word of the source packet SP is a terminal-selection word. The first instruction of the processor after the wait state B is the conditional jump instruction EOP. The word tested is not an end-of-packet word so that the answer to that question EOP is no N. The next instruction is the conditional jump instruction SOPSCAN. Since the word is not a start-of-packet-scan word, the answer to that question SOPSCAN is also no N and the processor jumps to its next instruction. This next instruction is a conditional jump instruction TS and because the word tested is a terminal-selection word, the response is yes Y and the processor jumps back to its wait state B. Furthermore, this terminal-selection word is returned to TCEA by the return packet RP and the terminal select signal SEL is generated by the DPTC terminal selector and latching circuit DPTCSEL. The address of the terminal contained in the terminal-selection word is extracted by the channel 16 main decoder and latching circuit CH16MDEC where it is latched. This address is transmitted on the output bus CC3–CC0 of the CH16MDEC according to the selection signal A/B.

The next word in the example of FIG. 3 is a read command. The processor starting now again from the wait state B, a negative response N is provided to the successive questions EOP, SOPSCAN and TS. The next instruction is the conditional jump instruction SEL and, because the terminal was selected by the previous word, the response to this question is yet Y so that the next conditional jump instruction R/W can be performed. The answer to the question R/W is read R and the next following instruction is the execute instruction N→IR which controls the transfer of data between the requested register or RAM location and the instruction register IRA. The register address or the byte address in the RAM is extracted from the read command by the channel 16 main decoder and latching circuit CH16MDEC and is transmitted on the output bus BYAD2–BYAD0. The terminal address, if needed, is available on the bus CC3–CC0. The return packet RP echoes the read command to TCEA with the requested data inserted. After these operations, the processor returns to the wait state B.

A write command including data follows the read command in the source packet SP. The same way as for the preceding read command is followed. The processor start from the wait state B and the successive conditional jump instructions EOP, SOPSCAN and TS receive a negative response N. The terminal select signal SEL is still valid from a previous word so that an affirmative answer is given to the conditional jump instruction SEL. The next following conditional jump instruction R/W has now a write response W and the next instruction is an execute instruction IR→N which controls the transfer of data between the instruction register IRA and the register of RAM location in the DPTC. Since the terminal address selected before the previous read command is not changed, the same terminal or line address in the RAM will be used, this address being still given on the output bus CC3–CC0 of the CH16MDEC. Moreover, the address of the control register or the address of the byte of the terminal is given by the write command itself and is transmitted on the output bus BYAD2–BYAD0 of the channel 16 main decoder and latching circuit CH16MDEC. This latter address may be different from the one given in the previous read command. The final wait state of the processor is still the wait state B and the instruction register IRA is loaded with the write command and the corresponding data for the return packet RP.

A terminal-selection word follows the write command. This causes a negative response N to the conditional jump instructions EOP and SOPSCAN but an affirmative answer Y to the conditional jump instruction TS. As described above the circuits DPTCSEL and CH16MDEC select a new terminal and/or eventually another DPTC. If the DPTC identity included in the terminal-selection word and the DPTC identity indicated by the inputs STR of DPTCSEL match, a new terminal select signal SEL is generated and latched in the DPTCSEL and the address of the new selected terminal is supplied at the output bus CC3–CC0 of CH16MDEC where it is also latched. The terminal selection word is returned to TCEA by the return packet RP and the processor ends in the wait state B.

The source packet SP from TCEA contains now a read command. Starting from the wait state B of the flow-chart, the same processing as the one described above for the previous read command is followed but the terminal address is now different. As above, the break point in the flow-chart is the wait state B and the read command is returned to TCEA by the return packet RP with the data included.

Scanning further in the source packet SP generated by YCEA, the following word is a start-of-packet-scan word. The processor starts again from the wait state B of the flow chart and its next operation is the conditional jump instruction EOP to which the response is no N and which is followed by the conditional jump instruction SOPSCAN which receives now an affirmative answer Y. The processor ends now in the wait state C and the start-of-packet-scan word is returned to TCEA.

If mismatch information MMIs is present in the FIFO corresponding to the A side of the DPTC, it will now be transmitted to TCEA via the return packet RP. The last word of the source packet SP is an end-of-packet word and will only be echoed to TCEA by the return packet RP when all the MMIs are transmitted, i.e. when a signal EOPSCAN is supplied by the common line handler for the A side of the DPTC.

As long as no signal EOPSCAN is sent by the corresponding common line handler, a negative answer N is given to the conditional jump instruction EOPSCAN which follows the wait state C of the processor. Then, every time that the signal MYTURN is provided by the same common line handler, the answer to the conditional jump instruction MYTURN is yes Y and one MMI of the FIFO is loaded in the instruction register IRA to be sent to TCEA by the return packet RP. After each MMI sent, the processor returns to the wait state C. Alternatively, when the signal MYTURN is not provided the answer to the conditional jump instruction MYTURN is no N and the contents of the instruction register IRA is reset to zero via the signal IRRESA generated by the control logic circuit CLC. The final state of the processor is then also the wait state C.

When all the MMIs of the FIFO for the A side of the DPTC are sent to TCEA via the return packet RP or when the length of this return packet RP has exceeded a predetermined value, the signal EOPSCAN is generated by the corresponding common line handler. The answer to the conditional jump instruction EOPSCAN is then yes Y and the next following instruction is the execute instruction EOP→IR which controls the transmission of an end-of-packet word in the return packet RP. This end-of-packet word which has the logical value 0 as mentioned above, is loaded in the instruction register IRA by the control logic circuit CLC via the output signal IRRESA of the latter. The processor returns then to the wait state A and a new source packet may be generated by TCEA.

From the above it follows that the processor controlled by the AUTOMATON alternatively controls the transfer of control data between the DPTCs and alternatively TCEA and TCEB. The transfer between TCEA and the DPTCs happens via the TDM links TINA and TOUTA and is dependent of the transfer of data between TCEB and the same DPTCs which goes via the TDM links TINB and TOUTB.

While the principles of the invention have been described above in connection with specific apparatus, it is to be clearly understood that this description is made only by way of example and not as a limitation on the scope of the invention.

What is claimed is:

1. A telecommunication switching system, comprising:
   a plurality of terminal circuits;
   a common control device associated with said plurality of terminal circuits, said common control device including a processor and control means;
   a plurality of terminal control elements each operating asynchronously; and
   a switching network, said terminal control elements coupling said common control device to said switching network, said control means functioning to successively allocate said processor to each of said terminal control elements.

2. A telecommunication switching system as described in claim 1, wherein said processor includes a memory for storing a program of instructions partitioned in a pluarality of segments and processing means to control the execution of said instructions and to generate a first signal indicative of the completion of the execution of the instructions of a segment, and that said control means allocate said processing means to a selected one of said terminal control elements for the duration of the execution of the instructions of a segment.

3. A telecommunication switching system as described in claim 2, wherein said common control device further includes means for generating second signals occurring at predetermined time intervals and allocated to respective ones of said terminal control elements and that said control means have a first input to which said first signal is applied and a plurality of second inputs to which said second signals are applied, said control means including means which in response to said second signals generate a third signal indicative of one of said terminal control elements, and means which in response to said first signal generate a fourth signal to make said processor start the execution of the instructions of one of said segments, said one segment being a function of said third signal.

4. A telecommunication switching system as described in claim 3, wherein said processing means include a plurality of program counter means associated with respective ones of said terminal control elements and each able to store an address of an instruction having to be executed and selection means controlled by said third signal to select one of said program counter means which then access said memory at said address stored in said one program counter means.

5. A telecommunication switching system as described in claim 4, wherein said program of instructions stored in said memory includes a first and a second set of instructions all having the same length and including control data supplied at outputs of said memory, the instructions of said second set moreover including a condition and an address of another instruction, and that said processing means for each instruction of said first set calculate the address of the next following instruction from said instruction length and for each instruction of said second set calculate the address of the next following instruction either from said instruction length or from said address of another instruction depending upon whether said condition is met.

6. A telecommunication switching system as described in claim 5, wherein said common control device further includes transmission means coupled with said plurality of terminal control elements and adapted to receive data from either one of said terminal control elements and having outputs coupled to decoder means adapted for decoding said received data and for providing at their outputs corresponding output signals and second selection means coupled to said outputs of said decoding means and to said memory outputs and able to select one of said output signals under the control of said control data and to apply it as a control signal to an output of the second selection means in order to control the operation of said program counter means.

7. A telecommunication switching system as described in claim 6, wherein said transmission means are coupled to each of said plurality of terminal control elements via time division multiplex links comprising a plurality of time channels during predetermined ones of which said second signals are generated.

8. A telecommunication switching system as described in claim 6, wherein said processing means further include logical means controlled by said third signal by said control data forming part of the instruction being executed and provided at said memory outputs to detect to which set of instructions this instruction belongs, and by said control signal, said logical means controlling said program counter means to calculate the address of said following instruction in case an instruction of said second set is detected.

9. A telecommunication switching system as described in claim 8, wherein said processing means further include output means providing said first signal responsive to said control data provided at the outputs of said memory, and that said logical means under the control of said first signal, block said program counter means after the completion of the execution of all the instructions of one of said segments.

10. A telecommunication switching system as described in claim 9, wherein said transmission means are coupled to each of said plurality of terminal control elements via time division multiplex links comprising a plurality of time channels during predetermined ones of which said second signals are generated.

* * * * *